Patented Mar. 3, 1942

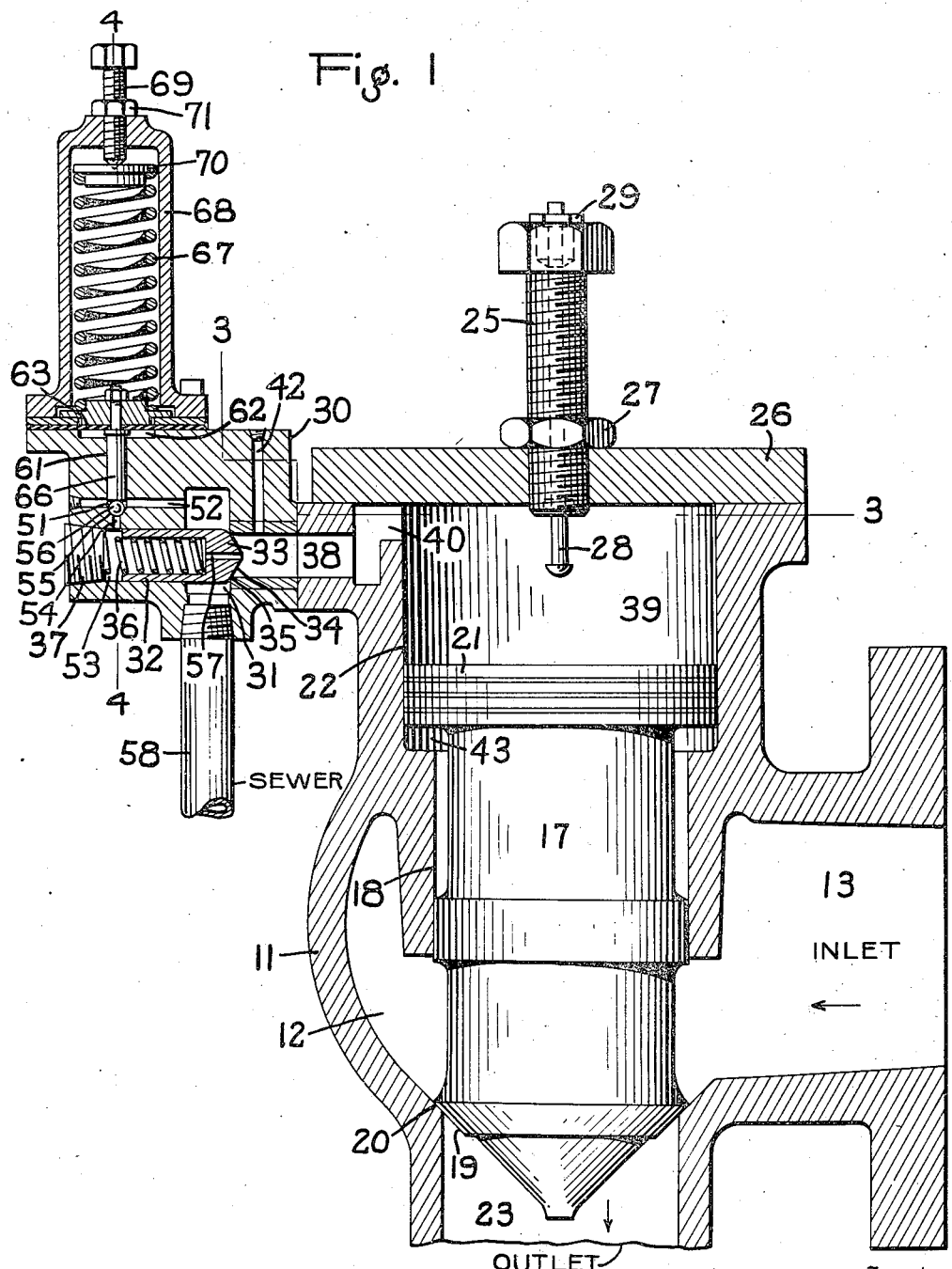

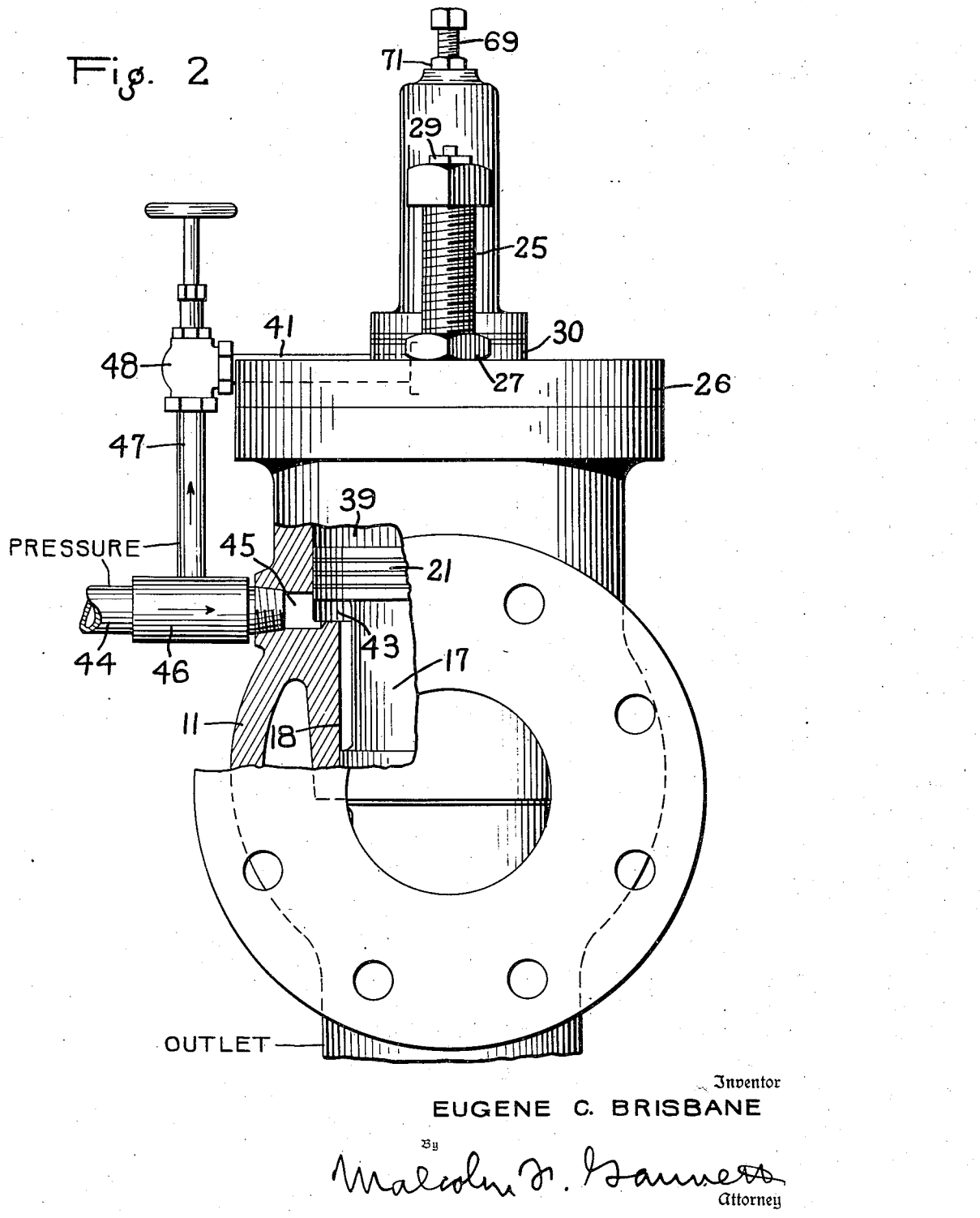

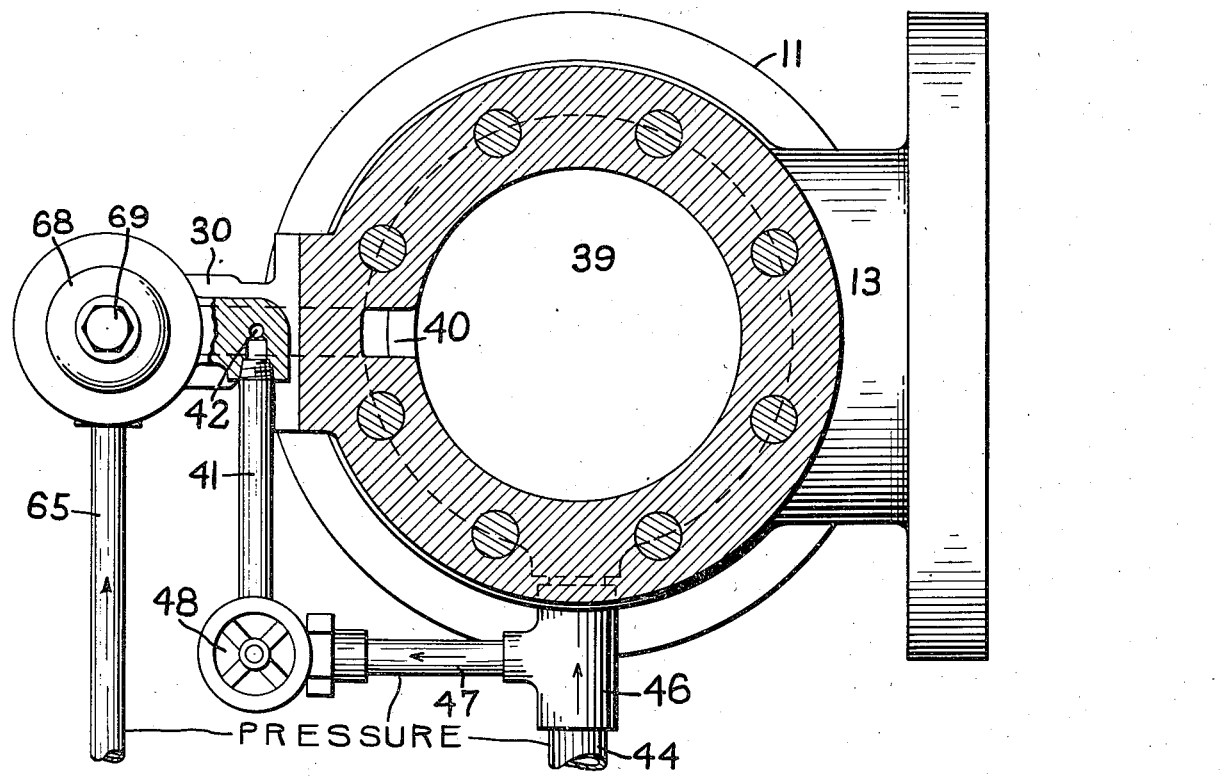

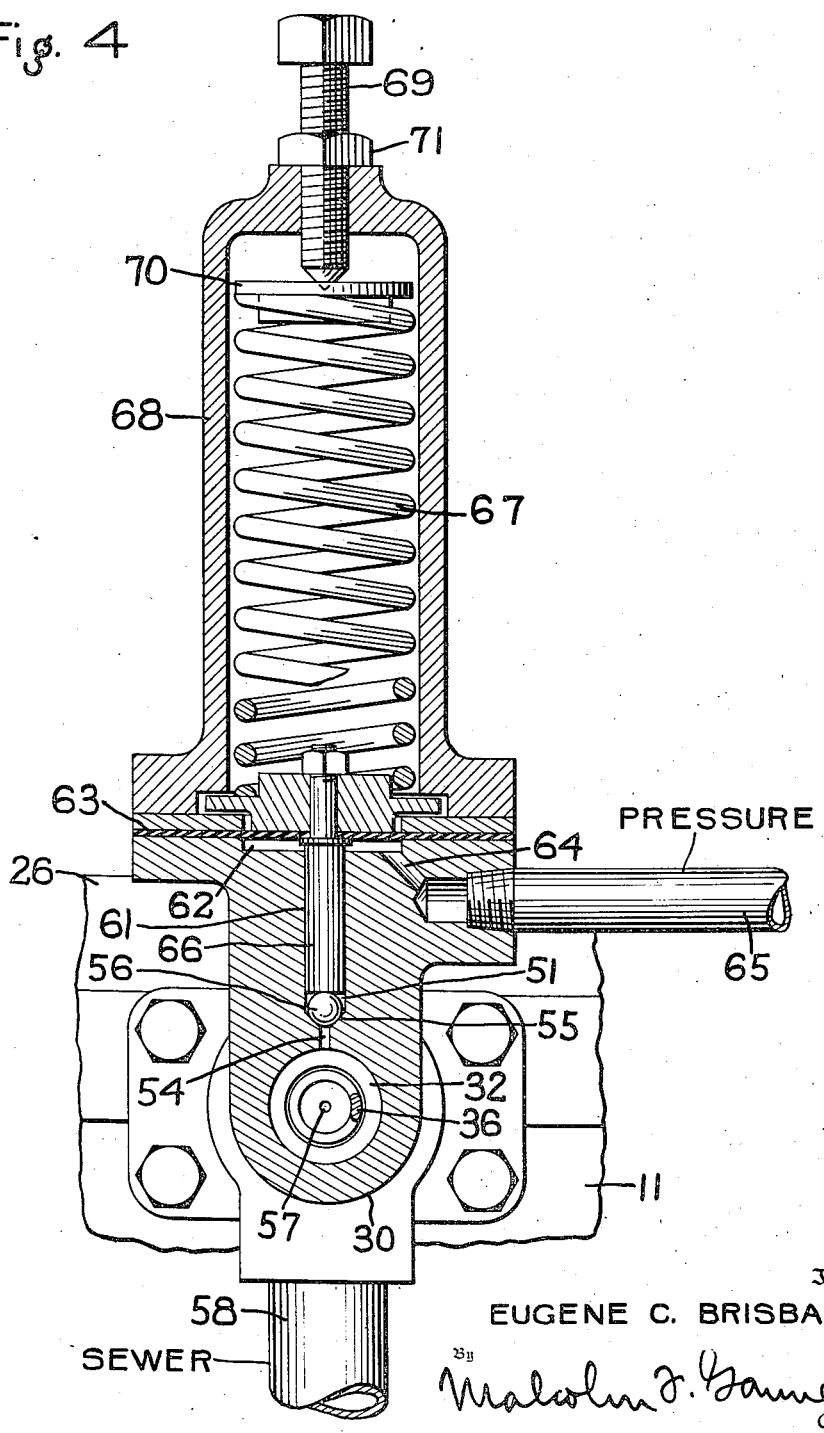

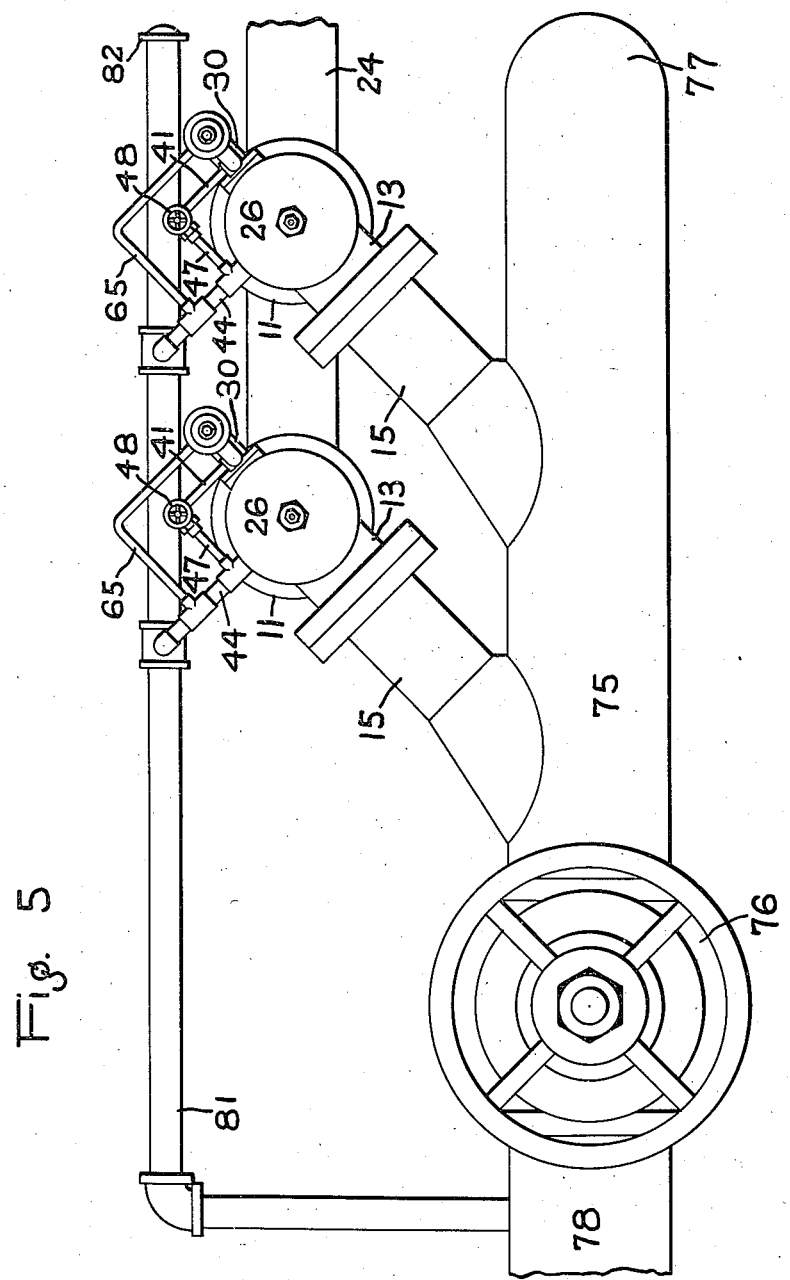

2,274,663

UNITED STATES PATENT OFFICE 2,274,663

RELIEF VALVE

Eugene C. Brisbane, York, Pa., assignor to S. Morgan Smith Company, York, Pa., a corporation of Pennsylvania Application June 5, 1940, Serial No. 338,875

7 Claims. (Cl. 137—53)

This invention relates to fluid pressure control means, and particularly to relief valves of the type intended primarily to be used with pipe lines and the like, for quickly relieving the pressure of the fluid therein when the pressure of the fluid exceeds a predetermined amount.

An object of the invention is to provide an improved relief valve which is actuated through the operation of a pressure operated pilot valve directly connected to the fluid under pressure in the main pipe line.

Another object of the invention is to provide a simple, efficient and relatively inexpensive relief valve adapted to be actuated by fluid pressure under the control of a plunger valve which is controlled by a spring loaded diaphragm valve device.

With the foregoing and other objects and advantages in view, the invention consists in the construction and arrangement of the several parts which will be hereinafter more fully described and claimed.

In the accompanying drawings:

Figure 1 is a vertical section of a relief valve embodying the invention;

Fig. 2 is an elevation, partly in section, of the valve shown in Fig. 1, looking at the inlet side thereof;

Fig. 3 is a horizontal section taken on the line 3—3, Fig. 1;

Fig. 4 is a vertical section taken on the line 4—4 of Fig. 1, and

Fig. 5 is a plan view of a pair of the relief valves arranged to control the pressure in a pipe line.

Referring to the drawings, the improved relief valve comprises a casing 11 having a chamber 12 formed therein which is connected by a passage 13 to a header or pipe 15 (see Fig. 5), so that said chamber is always in communication with said pipe, and the fluid under pressure in the pipe 15 is always present in the valve chamber 12.

A piston valve 17 is mounted in a bore 18 formed in the body of the casing 11.

The piston valve 17 comprises a main body portion which at one end is formed with a tapered portion 19 adapted to engage a seat 20 formed in the casing 11. The opposite end of the piston valve 17 is formed with a head or piston 21 which is mounted in a cylinder 22 formed in the casing in axial alinement with said valve seat. The piston head 21 has a greater area than the diameter of the main body portion of the piston valve 17.

The piston valve 17 is adapted to control communication from the chamber 12 to a free discharge passage 23. The passage 23 may be connected to a sewer 24 (Fig. 5) when so desired. The valve seat 20 is preferably formed at the upper end of the passage 23 so that when the piston valve 17 is seated communication is shut off from the chamber 12 to the sewer.

The piston valve 17 is adapted to be operated by fluid under pressure under the control of a pilot valve device, indicated generally by the reference numeral 30.

The pilot valve device 30 which is adapted to be automatically operated by fluid under pressure in the manner to be hereinafter more fully described, comprises a casing formed with a chamber 31, in which is mounted a plunger valve 32 (see Fig. 1).

The plunger valve 32 comprises a body which at one end is formed with a head 33 having a tapered portion 34 adapted to engage a seat 35. Rearwardly of the head 33 the plunger valve 32 is tubular in form and has an open end.

Mounted within the tubular portion of the plunger valve 32 is an expansible coil spring 36. One end of the spring bears against the head 33 and the other end of said spring bears against a plug 37 mounted in the end of the chamber 31. The purpose of the spring 36 is to retain the plunger valve 32 normally in engagement with the seat 35.

The plunger valve 32 is adapted to control communication between the chamber 31 and an auxiliary pressure chamber 38.

The chamber 38 is connected to chamber 39 at the top of piston 21, through a passage 40.

The chamber 38 is also connected to a pipe 41, Fig. 3, by a passage 42 extending vertically from said chamber.

The piston chamber 43 on the lower side of the piston 21 is connected to a pipe 44, by a passage 45 (see Figs. 2 and 3).

The pipe 44 is connected to a source of fluid under pressure, and in order that fluid under pressure can be also supplied to piston chamber 39, pipe 44 may be fitted with a connection 46 for a branch pipe 47.

At the point where the branch pipe 47 is connected to the pipe 41 there is provided a needle valve 48 for controlling the flow of fluid to chambers 38 and 39, as will be hereinafter more fully described.

The chamber 31 is connected to a chamber 51 by a passage 52 (see Fig. 1).

Chamber 51 is connected to chamber 53 at the rear end of the plunger 32 by a passage 54.

At the point where passage 54 is connected to chamber 51 there is a seat 55 for a ball check valve 56.

The head 33 of the plunger valve 32 is formed with a passage or orifice 57 so that fluid under pressure supplied to chamber 38 will be supplied to chamber 53 at the rear side of said plunger. The fluid under pressure thus supplied to chamber 53 is normally bottled up in said chamber by ball check valve 56.

The chamber 51 is located at the lower end of a passage or bore 61 which connects said chamber with a chamber 62 on one side of a diaphragm 63 (see Figs. 1 and 4).

The chamber 62 is connected to a source of fluid under pressure by a passage 64 and pipe 65, as shown in Fig. 4.

Fixed to the diaphragm 63 and disposed in the bore 61 is a stem 66 which bears against the ball 56 in order to retain said ball in engagement with the seat 55 under normal operating conditions.

Acting against the side of the diaphragm 63 opposite to the side facing the chamber 62 is an expansible coil spring 67.

The spring 67 is mounted in a cylindrical housing 68 fastened to the body of the valve device 30, and the tension of the spring is adapted to be set by means of a screw 69 threadedly mounted in the upper end of said housing 68. The shank of the screw 69 extends into the housing and engages a disk 70 disposed at the upper end of the spring 67. A nut 71 mounted on the shank of the screw 69 is adapted to be turned down against the upper end of the housing to lock the screw in adjusted position.

The pressure exerted by the spring 67 on the diaphragm is such that the ball check valve 56 is held seated against the pressure of the fluid supplied to the chamber 62 from the pipe 65. However, when the pressure of the fluid in chamber 62 exceeds the pressure of the spring 67, the diaphragm 63 will be moved upwardly thus permitting the ball check valve 56 to move away from the seat 55, so that the fluid in chamber 53 will vent to the sewer through passages 54 and 52, chamber 31 and pipe 58.

When the pressure of the fluid in chamber 53 is thus reduced, the pressure of the fluid in chambers 38 and 39 acting on the head 33 of the plunger valve 32 forces said plunger valve towards the plug 37 against the pressure of spring 36, which latter pressure is insufficient to hold the plunger valve 32 against the seat 35.

When the plunger valve 32 is thus unseated, chambers 38 and 39 will be connected through chamber 31 to the sewer 58. The pressure of the fluid supplied to piston chamber 43 by pipe 45, acting on the bottom of piston 21, causes the piston valve 17 to move rapidly upwardly away from the seat 20, thereby connecting chamber 12 with the free discharge provided by passage 23. This results in a quick discharge of fluid under pressure from the header 15 through passage 13, chamber 12 and passage 23, so that the pressure of the fluid in the header is quickly reduced.

As soon as the pressure of the fluid in the header 15 drops a predetermined amount, the force exerted by the spring 67 acting on the diaphragm 63 will move said diaphragm and the stem 66 downwardly so that the ball check valve 56 is seated against the seat 55. In this way communication from the chamber 53 to the free discharge pipe 58 through passages 54 and 52 and chamber 31 will be cut off. The spring 36 now moves the plunger valve 32 against the seat 35. The passage 57 permits equalizing of pressures on both sides of the plunger 32, thereby causing the plunger to seat firmly. Fluid from the supply pipe 44 is admitted through the pipes 47 and 41, passage 42, chamber 38 and passage 40, to the piston chamber 39. The rate of flow of the fluid from the pipe 44 to the chamber 38 is controlled by the needle valve 46. In actual practice the rate at which the fluid is supplied to the piston chamber 39 is relatively slow so that the piston valve 17 will be moved down towards the seat 20 very slowly, thereby gradually closing the communication from the inlet 13 to the free discharge 23, so that surges and hammering will be reduced to a minimum.

The upward movement of the piston valve 17 may be limited by a screw 25 threadedly mounted in the top 26 of the valve casing 11, said screw being retained in adjusted position by means of a lock nut 27.

Slidably mounted in the screw 25 is a stem 28 for indicating the position of the piston valve 17.

A packing nut 29 mounted in the upper portion of the screw 25 serves as means for frictionally engaging the stem 28 so as to retain said stem in position in the screw. The packing nut 29 also prevents leakage of fluid in the chamber 39 through the bore in the screw 25 in which the stem is mounted.

When the piston valve 17 is in seated position the lower end of the stem 28 will be spaced from the top of the piston head 21. During upward movement of the piston valve 17, the head 21 engages the lower end of the stem 28 and forces said stem upwardly until the upward movement of the piston valve is arrested when the head 21 strikes the lower end of the stop screw 25. The stem 28 thus indicates that an operation of the piston valve 17 has occurred. After the piston valve has returned to its seat 20, the stem 28 can be manually restored to the position shown in Fig. 1.

A pressure relief valve of the type herein described is adapted to function to limit to a predetermined maximum the pressure on its inlet side regardless of any variation in the pressure on its outlet side.

One example of pressure relief service is the installation of the valve in a gravity line for the maintenance of a predetermined low pressure in the line above the valve.

The relief valve can also be used for the dissipation of surges in any pressure line. In such installations the relief valve is actuated by pressure in excess of an adjustable predetermined setting. When the line pressure rises to the predetermined point, the piston valve 17 will be actuated in the manner heretofore described and thus effect a reduction in line pressure.

In systems where the pipe lines have variable flow conditions, it is customary to use batteries of the relief valves. Valves in such batteries are set to operate at successively higher pressures. In this way only the proper number of relief valves will open which are necessary to compensate for the variation in the flow conditions in the lines. By such method an excess discharge area, which under the particular flow condition might exist with a single large relief valve, is not employed. A resulting undesirable pressure drop and increased flow are thus largely avoided.

In the installation shown in Fig. 5, the header or pipe 15 may be the pipe leading from a conduit 75 on the downstream side of a gate valve 76, said conduit having a closed end 77.

The upstream side of the gate valve 76 is connected to a pipe 78 containing fluid under pressure which it is desired to control.

Normally the gate valve 76 is open so that communication is established between the pipe 78 and the conduit 75.

Any number of headers 15 may be connected to the conduit 75 and each header has a relief valve 11 connected thereto, as shown in Fig. 5.

Each relief valve is connected to the free discharge or sewer 24 so that when the piston valve 17 is opened the fluid will be carried away.

In order to supply the battery of relief valves with operating fluid under pressure, a pipe 81 is connected to the pipe 78 on the upstream side of the gate valve 76.

The pipe 81 extends from its connection with the pipe 78 to a position in proximity with the relief valves. The end of the pipe 81 is closed, as indicated at 82.

The fluid supply pipe 65 heretofore referred to may be connected to the fluid supply pipe 44, and the pipe 44 in turn is connected to the pipe 81.

In this way fluid under pressure is supplied to the relief valves in order to effect operation of said relief valves in the manner heretofore described.

In installations where one or more relief valves are operatively connected to a line for the purpose of controlling the pressure of the fluid therein, it is usually the practice to adjust the tension of the spring 67 so that the relief valves will operate successively upon a predetermined increase in pressure of the fluid in the main pipe line 78. In other words, the relief valves are adapted to operate successively at different pressure levels. In this way where there is a small surge or slight increase of pressure of the fluid in the main pipe 78, only one relief valve would be actuated to relieve the pressure. In case of a large surge or perceptible increase in the pressure of the fluid in the main pipe line 78, more than one relief valve would be actuated.

Having thus described my invention, what I claim is:

1. A pressure relief valve comprising a casing having a chamber directly connected to a fluid inlet, a piston valve mounted in said casing for controlling communication from said chamber to an outlet, said piston valve having a piston mounted in a cylinder formed in said casing in spaced relation to said chamber, a passage for providing communication between the chamber in said cylinder on the lower side of said piston and a source of fluid under pressure, a passage for providing communication between the chamber on the upper side of the piston and an auxiliary pressure chamber, means for supplying fluid under pressure in a restricted amount to said auxiliary pressure chamber, a free discharge, and means for controlling the fluid in said auxiliary pressure chamber comprising a plunger for controlling communication between the auxiliary pressure chamber and said free discharge, means for controlling the operation of said plunger and including a diaphragm subject on one side to the pressure of the fluid in said inlet and subject on the opposite side to the pressure of a spring, said plunger being subject on one side to the pressure of the fluid in said auxiliary pressure chamber and being subject on the rear side to the combined pressures of a spring and fluid from the auxiliary pressure chamber, and means actuated by said diaphragm when the inlet fluid pressure increases a predetermined amount for releasing the fluid pressure on the rear side of said plunger.

2. A pressure relief valve comprising a casing having a chamber formed therein, said chamber adapted to be directly connected to a header, a tapered valve seat formed in the bottom of said chamber, a cylinder formed in the casing above said chamber in axial alinement with said valve seat, a bore formed in said casing between said chamber and said cylinder, said bore having a diameter less than the diameter of said cylinder, a main piston valve having a cylindrical body portion mounted in said bore and a piston head mounted within said cylinder, a tapered portion formed on the lower end of said cylindrical body portion for engagement with said valve seat, an exhaust passage leading from the valve seat and adapted to be closed when the piston valve is in engagement with said valve seat, a passage leading from the chamber in said cylinder on the lower side of said piston to a source of fluid under pressure, a passage leading from the chamber on the upper side of the piston to an auxiliary pressure chamber, means for supplying a restricted amount of fluid under pressure to said auxiliary pressure chamber, a free discharge, a plunger valve for controlling communication between the auxiliary pressure chamber and said free discharge, means for controlling the operation of said plunger valve and including a diaphragm subject on one side to the pressure of the fluid in the header and subject on the opposite side to the pressure of a spring, said plunger valve being subject on one side to the pressure of the fluid in said auxiliary pressure chamber and being subject on the rear side to the combined pressures of a spring and fluid admitted through an orifice in said plunger valve from the auxiliary pressure chamber side thereof, and a ball check valve actuated under the control of said diaphragm for controlling communication from the chamber on the rear side of said plunger valve to said free discharge.

3. A pressure relief valve comprising a casing having a chamber directly connected to a fluid inlet, a piston valve mounted in said casing for controlling communication from said chamber to an outlet, said piston valve having a piston mounted in a cylinder formed in said casing in spaced relation to said chamber, a passage for providing communication between the chamber in said cylinder on the lower side of said piston and a source of fluid under pressure, a second passage for providing communication between the chamber on the upper side of the piston and a source of fluid under pressure, said second passage having a portion of small area and a portion of relatively large area, the portion of relatively large area of said second passage constituting an auxiliary pressure chamber, a valve for controlling the flow of fluid under pressure through said second passage to said upper piston chamber whereby a restricted amount of fluid under pressure is supplied to said auxiliary pressure chamber and to the upper piston chamber at all times, a free discharge, a plunger valve for controlling communication between said auxiliary pressure and said free discharge, a chamber at the rear side of said plunger valve, an orifice in said plunger valve for connecting said auxiliary pressure chamber with the chamber at the rear side of said plunger valve, a spring mounted in the chamber at the rear side of said plunger valve, said plunger valve being subject on one side to the pressure of the fluid in said auxiliary pressure chamber and being subject on the opposite side to the combined pressures of said spring and the fluid in the chamber at the rear side of said plunger valve, a third passage connecting the chamber at the rear side of said plunger valve with said free discharge, a second control valve for controlling communication through said third passage, said second control valve being adapted to close said third passage when the pressure of the fluid in said fluid inlet does not exceed a predetermined amount, and means operable by a predetermined increase in pressure of the fluid in said fluid inlet for actuating said second control valve so as to establish communication through said third passage to thereby release the fluid pressure in the chamber on the rear side of said plunger valve through said free discharge.

4. A pressure relief valve comprising a casing having a chamber directly connected to a fluid inlet, a piston valve mounted in said casing for controlling communication from said chamber to an outlet, said piston valve having a piston mounted in a cylinder formed in said casing in spaced relation to said chamber, a passage for providing communication between the chamber in said cylinder on the lower side of said piston and a source of fluid under pressure, a second passage for providing communication between the chamber on the upper side of the piston and a source of fluid under pressure, said second passage having a portion of small area and a portion of relatively large area, the portion of relatively large area of said second passage constituting an auxiliary pressure chamber, a valve for controlling the flow of fluid under pressure through said second passage to said upper piston chamber whereby a restricted amount of fluid under pressure is supplied to said auxiliary pressure chamber and to the upper piston chamber at all times, a free discharge, a plunger valve for controlling communication between said auxiliary pressure chamber and said free discharge, a chamber at the rear side of said plunger valve, an orifice in said plunger valve for connecting said auxiliary pressure chamber with the chamber at the rear side of said plunger valve, a spring mounted in the chamber at the rear side of said plunger valve, said plunger valve being subject on one side to the pressure of the fluid in said auxiliary pressure chamber and being subject on the opposite side to the combined pressures of said spring and the fluid in the chamber at the rear side of said plunger valve, a third passage connecting the chamber at the rear side of said plunger valve with said free discharge, a second control valve for controlling communication through said third passage, said second control valve being adapted to close said third passage as long as the pressure of the fluid in said fluid inlet does not exceed a predetermined amount, means for controlling the operation of said second control valve comprising a diaphragm subject on one side to the pressure of the fluid in said inlet and subject on the opposite side to the pressure of a spring, and means carried by said diaphragm and adapted to release said second control valve so as to open said third passage when the pressure of the fluid in said inlet acting on the diaphragm exceeds the pressure of said diaphragm spring.

5. A pressure relief valve comprising a casing having a chamber directly connected to a fluid inlet, a piston valve mounted in said casing for controlling communication from said chamber to an outlet, said piston valve having a piston mounted in a cylinder formed in said casing in spaced relation to said chamber, a passage for providing communication between the chamber in said cylinder on the lower side of said piston and a source of fluid under pressure, a second passage for providing communication between the chamber on the upper side of the piston and a source of fluid under pressure, said second passage having a portion of small area and a portion of relatively large area, the portion of relatively large area constituting an auxiliary pressure chamber, a valve for controlling the flow of fluid under pressure through said second passage to said upper piston chamber whereby a restricted amount of fluid under pressure is supplied to said auxiliary pressure chamber and to the upper piston chamber at all times, a free discharge, a plunger valve for controlling communication between the auxiliary pressure chamber and said free discharge, said plunger being subject on one side to the pressure of fluid in said auxiliary pressure chamber and being subject on the rear side to the combined pressure of a spring and fluid admitted to a chamber on the rear side of said plunger from the auxiliary pressure chamber by means of an orifice formed in said plunger, an exhaust passage connecting the chamber on the rear side of the plunger with said free discharge, a ball valve for controlling communication through the rear plunger chamber exhaust passage, and means for normally retaining said ball valve seated comprising a diaphragm having a stem engaging said ball, said diaphragm being subject on one side to the pressure of fluid in said fluid inlet and being subject on the opposite side to the pressure of a spring under predetermined load, said diaphragm being operable to release said ball when the pressure in said fluid inlet exceeds a predetermined amount.

6. A pressure relief valve comprising a casing having a chamber adapted to be directly connected to a header, a piston valve mounted in said casing for controlling communication from said chamber to an exhaust passage, said piston valve having a piston mounted in a cylinder formed in said casing in spaced relation to said chamber, a passage for providing communication between the chamber in said cylinder on the lower side of said piston and a source of fluid under pressure, a second passage for providing communication between the chamber on the upper side of the piston and a source of fluid under pressure, said second passage having a portion of small area and a portion of relatively large area, the portion of relatively large area constituting an auxiliary pressure chamber, means for controlling the flow of fluid under pressure through said second passage to said upper piston chamber whereby a restricted amount of fluid under pressure is supplied to said auxiliary pressure chamber and to said upper piston chamber at all times, a free discharge, a plunger valve for controlling communication between the auxiliary pressure chamber and said free discharge, means including a fluid pressure chamber on the rear side of said plunger valve for holding said plunger valve seated against the pressure of fluid in said auxiliary pressure chamber, and means operable by an increase in fluid pressure in said header for releasing the fluid pressure on the rear side of said plunger valve so that the plunger valve is unseated by the fluid under pressure in said auxiliary pressure chamber acting on the front end thereof.

7. A pressure relief valve for a main pipe line, comprising a casing having a chamber adapted to be directly connected to the main, a piston valve mounted in said casing for controlling communication from said chamber to an outlet, said piston valve having a piston mounted in a cylinder formed in said casing in spaced relation to said chamber, a passage for providing communication between the chamber in said cylinder on the lower side of said piston and a source of fluid under pressure, a second passage for providing communication between the chamber on the upper side of the piston and a source of fluid under pressure, said second passage having a portion of small area and a portion of relatively large area, the larger portion of said second passage constituting an auxiliary pressure chamber, a valve for controlling the flow of fluid under pressure through said second passage to said upper piston chamber whereby a restricted amount of fluid under pressure is supplied to said auxiliary pressure chamber and to the upper piston chamber at all times, an exhaust passage for providing communication between the chamber on the upper side of the piston and a free discharge, a valve for controlling communication through said exhaust passage, means for normally retaining said second control valve seated to close said exhaust passage and including a pressure chamber on the rear side of said second control valve in communication with said auxiliary pressure chamber and a spring acting on the rear side of said second control valve, a port for connecting the rear pressure chamber of said second control valve with said free discharge, a ball for controlling the flow of fluid through said port, a pressure chamber directly connected to the main, pressure means operated by the fluid in said main pressure chamber, means connected to said pressure means for retaining the ball in position to cut off communication through said port when the pressure of fluid in said main pressure chamber is less than a predetermined amount, said pressure means being operable by an increase in pressure in the main pressure chamber to release the ball to thereby open the port and release the holding pressure for said second control valve, whereby the second control valve is unseated and communication is established from the upper piston chamber to the free discharge.

EUGENE C. BRISBANE.